Sept. 23, 1947.  L. H. SCORE ET AL  2,427,883
TUBE CLAMP
Filed May 29, 1942

INVENTOR.
LESLIE H. SCORE
& JOHN C. HAEPP JR.
BY H. W. Brelsford
ATTORNEY

Patented Sept. 23, 1947

2,427,883

UNITED STATES PATENT OFFICE 2,427,883

TUBE CLAMP

Leslie H. Score and John C. Haepp, Jr., North Hollywood, Calif., assignors, by mesne assignments, to Bendix Aviation Corporation, South Bend, Ind., a corporation of Delaware Application May 29, 1942, Serial No. 445,096

4 Claims. (Cl. 174—40)

This invention relates to tube clamps and more particularly to cushioned tube clamps using flexible plastic material for a cushion.

A tube clamp is used primarily to secure tubes or conduits to the frame or other parts of an airplane. The tube clamps are ordinarily cushioned to prevent injury to the tube. Since most cushion materials are electrical insulators, means must be provided to electrically bond the inner surface of the cushion to the airplane to prevent static discharges which interfere with radio transmission and reception.

In the past, synthetic rubber has been used to cushion a strap of metal, such as aluminum, forming together with the cushion a tube clamp. These materials, aluminum and synthetic rubber, have proved to be very expensive, and under wartime conditions difficult to obtain. The present invention relates to means for using flexible organic plastics in tube clamps in place of these scarce materials.

The materials commonly called flexible organic plastics are elastic, but differ from the so-called synthetic rubbers in that recovery to elastic deformation is slow. This characteristic, together with a lack of toughness, renders such compounds unfit for "rubber" applications but nevertheless qualifies them as excellent cushions. Such plastics include the polyvinyl acetates, chlorides and butyrals, vinyl chloride-acetate copolymers, vinylidene chloride, and to a certain extent such substances as methacrylate, cellulose acetate and ethyl cellulose. In general, such plastics are thermoplastic, but may be thermosetting plastics. Such substances will be referred to in this description as slow recovery plastics.

It is an object of the present invention to provide a tube clamp made principally from plastics.

It is an object of the invention to provide constructions of clamps which may be principally made from plastics, particularly slow recovery plastics.

A further object is to provide a slow recovery plastic cushion for use on a conventional tube clamp.

Other objects and advantages of the invention will be apparent in the following description and claims which will be best understood when described with reference to the accompanying drawing, in which:

Figure 1:
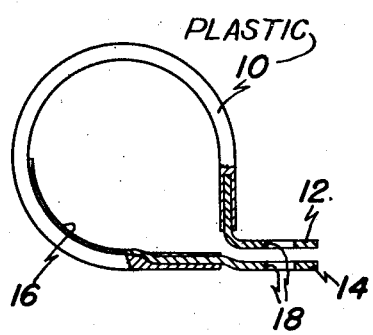
Figure 1 is an elevation view, partly in section, of a platsic tube clamp having metal ends and bonding strip.

Referring to Figure 1, a loop of plastic 10 has a metal angle piece 12 secured to one end by a cementing, vulcanizing or molding process. Secured to the other end of loop 10 is a metal member 14 having a thinned end 16 protruding through the plastic to lie along the inside thereof to act as a bonding strip for removing static charges. End pieces 12 and 14 have co-axial holes 18 therein through which a bolt may be inserted to hold the tube clamp and its associated tube to a proper support. The plastic material may be of any flexible type, such as rubber, synthetic rubber, or slow recovery plastics.

Figure 2:
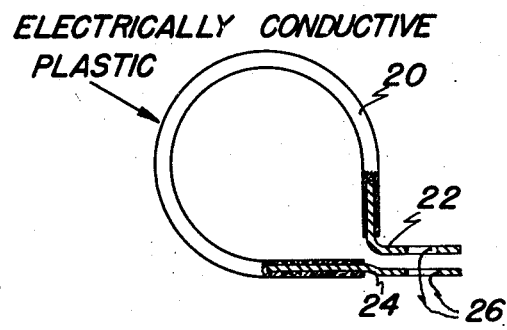
Figure 2 is an elevation view, partly in section, of a plastic tube clamp with metal ends, having electrically conductive ingredients compounded therein to make the whole clamp an electrical conductor to ground the tube held therein.

In Figure 2, a plastic loop 20 has an angle member 22 secured to one end by any suitable means, and has a generally flat member 24 secured to the other end. Both ends have holes 26 co-axial with each other for securing the clamp to a structure. Electrical bonding is secured by compounding lead oxide, metal shavings, or other materials in the plastic of loop 20. Such a strap is completely conductive throughout and transfers charges through ends 22 and 24 to the airframe in which the clamp is mounted.

Figure 3:
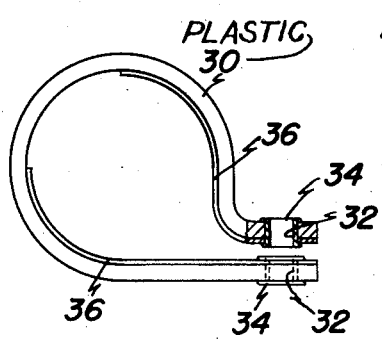
Figure 3 is an elevation view, partly in section, of a plastic tube clamp having metal bonding strips held thereto by hollow rivets.

Figure 3 shows a tube clamp having a loop 30 made entirely of plastic, having holes 32 in the ends. A hollow rivet 34 is placed in each hole and secures a bonding strip 36 to the inner surface of each end of the loop. A bolt may be passed through hollow rivets 34 to hold the clamp to a structure.

Figure 4:
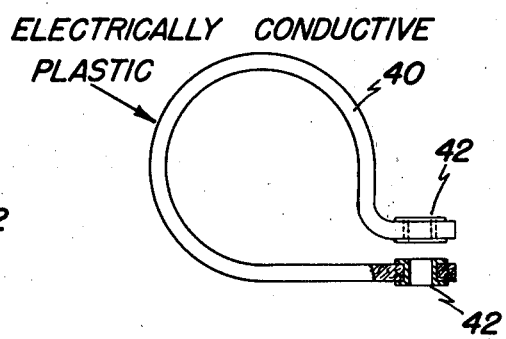
Figure 4 is an elevation view, partly in section, of an entirely plastic tube clamp having electrically conductive ingredients compounded therein to bond any tube.

Figure 4 shows a tube clamp with a loop 40 made entirely of plastic. The loop is compounded with electrically conductive material or has a chemical structure such as makes it electrically conductive. Hollow rivets 42 in each end reinforce the plastic.

Figure 5:
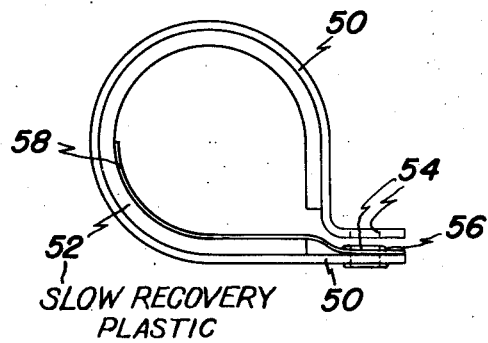
Figure 5 is an elevation view of a conventional tube clamp having a slow recovery plastic cushion substituted for the conventional cushion.

Figure 5 shows a conventional tube clamp with a loop of metal 50, a cushion 52 secured to the inner surface, holes 54 in the ends of the loop, and a rivet 56 in one hole to position a conductor strip 58 overlying a portion of cushion 52. Cushion 52 is of the slow recovery plastic type, and to insure against cold flow at higher temperatures, may have fabric formed therein. Thus a very cheap and effective cushion is provided for cushion clamp at a small fraction of the cost of synthetic rubber which is commonly used. Cushion 52 may also be of the "snap on" channel section type requiring no cement.

Figure 6:
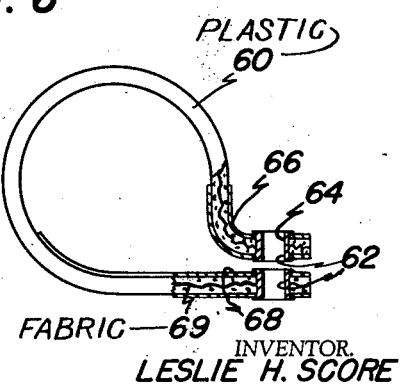
Figure 6 is a plastic clamp having the plastic reinforced with wire or cloth fabric to strengthen it.

In Figure 6 is shown a tube clamp of the plastic body type. A loop 60 has holes 62 in each end through which rivets 64 pass to hold parallel metal angle strips 66 on one end, and parallel flat strips 68 on the other end. The inside flat strip 68 is made long to act as a bonding strip. Loop 60 has metal or organic fabric 69 formed therein to give it greater tensile strength and freedom from cold flow.

Although this invention has been described with reference to particular embodiments thereof, it is not intended to limit it to this description, nor otherwise, except by the terms of the following claims.

We claim:

1. A tube clamp comprising a loop of relatively soft pliable plastic material having a pair of separate flat end tabs of material substantially harder and more rigid than said plastic material imbedded in the end portions only of said loop whereby said loop constitutes the sole connecting element between the two end tabs, said tabs having holes for receiving a securing element.

2. A tube clamp comprising a loop of relatively soft pliable plastic material having a pair of separate flat end tabs of material substantially harder and more rigid than said plastic material imbedded in and extending out through and beyond the end portions only of said loop whereby said loop constitutes the sole connecting element between the two end tabs, said tabs having holes for receiving a securing element.

3. A tube clamp comprising a loop of relatively soft pliable plastic material having a pair of separate flat end tabs of material substantially harder and more rigid than said plastic material imbedded in the end portions only of said loop whereby said loop constitutes the sole connecting element between the two end tabs, said tabs having holes for receiving a securing element and the imbedded portion of at least one of said tabs lying completely between the inner and outer surfaces of said loop.

4. A tube clamp comprising a loop of relatively soft pliable plastic material having a pair of separate flat end tabs of metal substantially harder and more rigid than said plastic material imbedded in the end portions only of said loop whereby said loop constitutes the sole connecting element between the two end tabs, said tabs having holes for receiving a securing element, at least one of said tabs having one portion lying against the inner surface of said loop for directly contacting a tube engaged by said loop, and another portion completely imbedded in said loop between the inner and outer surfaces thereof.

LESLIE H. SCORE.
JOHN C. HAEPP, Jr.

REFERENCES CITED

The following references are of record in the file of this patent:

UNITED STATES PATENTS

| Number | Name | Date |
| --- | --- | --- |
| 2,279,865 | Ellinwood | Apr. 14, 1942 |
| 1,756,038 | Shwayder | Apr. 29, 1930 |
| 2,298,560 | Harrison | Oct. 13, 1942 |
| 513,630 | Beard | Jan. 30, 1894 |
| 1,462,671 | Vrba | July 24, 1923 |
| 2,340,560 | Rempt | Feb. 1, 1944 |
| 2,279,866 | Ellinwood | Apr. 14, 1942 |